United States Patent [19]
Rando

[11] Patent Number: 5,146,463
[45] Date of Patent: Sep. 8, 1992

[54] POINTER BEAM FOR HAND-HELD LASER SCANNER

[75] Inventor: Joseph F. Rando, Los Altos Hills, Calif.

[73] Assignee: Spectra-Physics Scanning Systems, Inc., Eugene, Oreg.

[21] Appl. No.: 703,476

[22] Filed: May 20, 1991

[51] Int. Cl.⁵ .............................................. H01S 3/10
[52] U.S. Cl. ................................... 372/24; 235/467; 250/235; 250/566
[58] Field of Search .................. 372/24; 235/467; 250/235, 566

[56] References Cited
U.S. PATENT DOCUMENTS
4,861,973  8/1989  Hellekson et al. .................. 235/467

Primary Examiner—Léon Scott, Jr.
Attorney, Agent, or Firm—Killworth, Gottman, Hagan and Schaeff

[57] ABSTRACT

A laser scanner and method for simultaneously generating both a pointer beam and a scan pattern from a single laser source is provided by multiplexing a laser beam between at least one pointer beam path and at least one scanning beam path. Means for multiplexing include refractive and reflective optical components, and electronic means for modifying one or more properties of the laser beam.

52 Claims, 10 Drawing Sheets

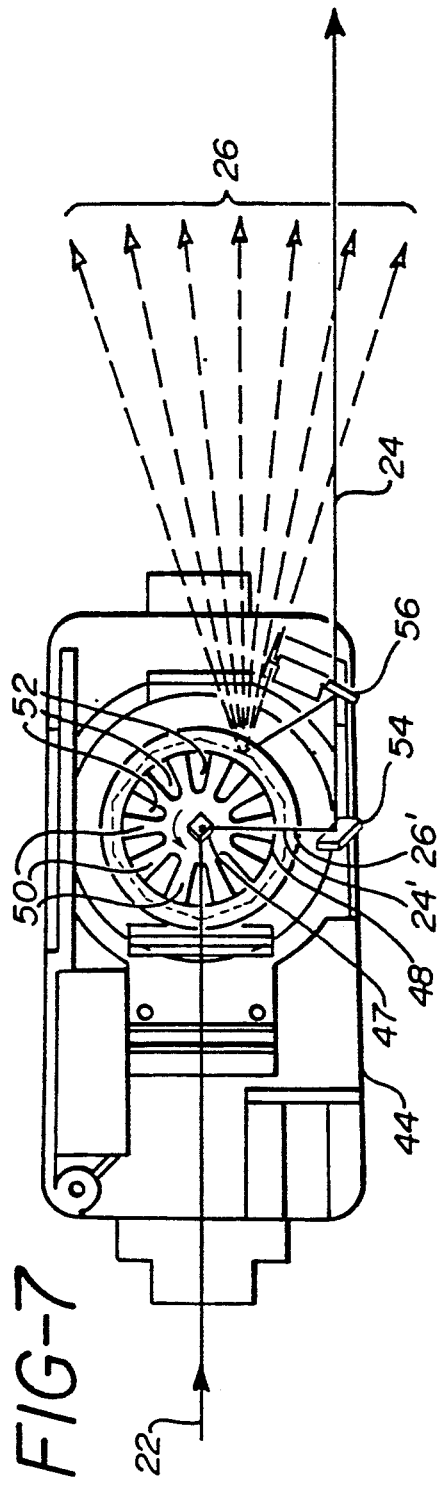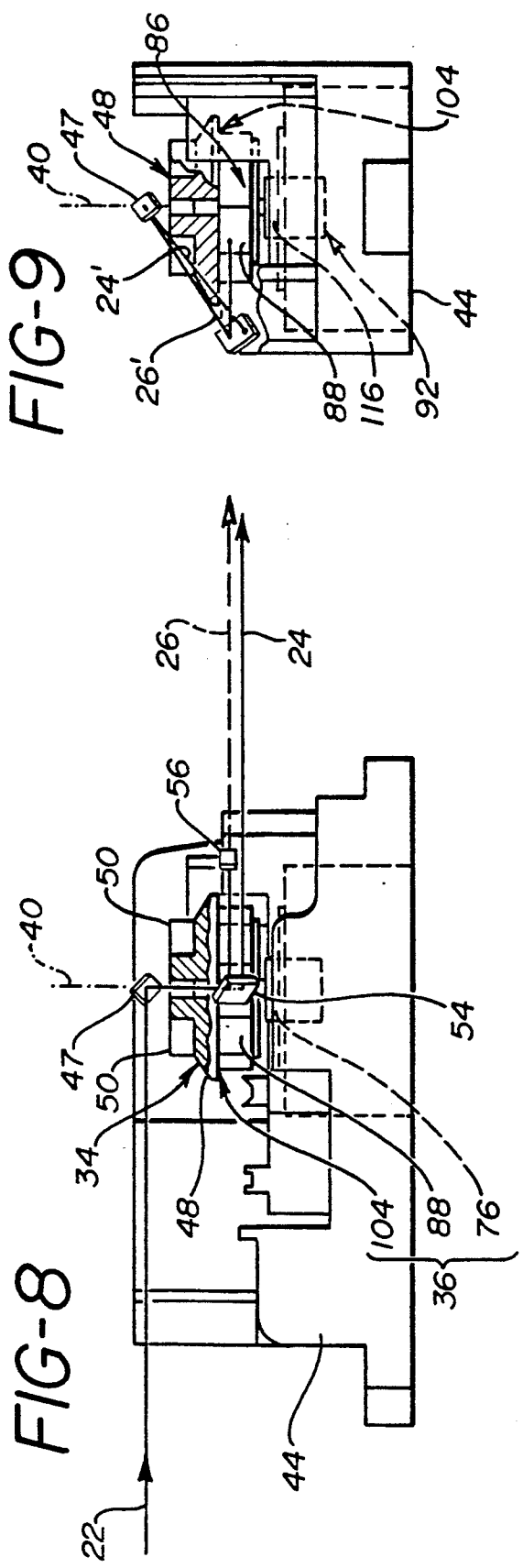

POINTER BEAM FOR HAND-HELD LASER SCANNER

BACKGROUND OF THE INVENTION

The present invention relates to the operation of laser scanners, and in particular to an apparatus for simultaneously generating both a pointer beam and scan pattern from a single laser source.

Bar code scanners are used in a wide range of retail, commercial, and industrial applications to read bar code symbols on numerous items for purposes such as checkout, inventory and tracking. Laser scanners developed for such applications include fixed scanners, such as counter-top scanners for check-out applications, and hand held scanners, which are used for many inventory and tracking applications. Typically, fixed scanners generate a scan pattern having a plurality of scan lines configured to provide a degree of freedom from orientation and directional constraints for bar code labels moving through the scan volume. By contrast, hand-held scanners typically use a single scan line pattern to read bar code symbols and, of course, rely on manual manipulation of the scanner to find the bar codes.

Representative of prior art laser scanners are compact scanners disclosed by Hellekson et al in U.S. Pat. No. 4,861,973 (the '973 patent), issued Au. 29, 1989; and hand-held laser scanners disclosed by Lonsdale et al, U.S. Pat. No. 4,678,288 (the '288 patent), issued Jul. 7, 1987. Regardless of the embodiment, laser scanners have an optical system composed of transmission optics, collection optics and a scan pattern generating arrangement.

The transmission optics typically include a low power laser, one or more small routing mirrors, a diverging lens, which may be on the end of the laser, and a focusing lens, which may be molded as part of a larger collection lens of the collection optics. The basic function of the transmission optics is to create and transmit a beam of laser light of the correct diameter to the scan pattern generating arrangement, which further transmits either a laser beam at the plane of the package label to illuminate the bars and spaces of a bar code symbol on the label. The scan pattern generating arrangement causes the beam to sweep across the package label in one or more scan lines.

The collection optics typically include a collection lens, a bandpass filter and a photodetector. The basic function of the collection optics is to gather and collect only the diffuse laser light reflected from the label and focus it onto a small detector. The light is collected and focused in such a way as to optimize the signal-to-noise ratio. In a retro-directive optical system, a cone of light returning from the label and surrounding the beam of light being transmitted to the label is collected by the collection lens. In this way, a substantial portion of ambient light is eliminated from the system. Additional filtering of ambient light "noise" is achieved by the bandpass filter.

The scan pattern generating arrangements of prior art laser scanners vary greatly. In a typical counter-top scanner they employ an optical arrangement including a mirror assembly consisting of a plurality of primary reflective mirror surfaces which spin about an axis, and further include a multiplicity of secondary reflective elements which move the beam of laser light through a three dimensional pattern capable of finding and reading labels in as many orientations as possible. Typical hand-held scanners may employ a similar arrangement including a spinning or rotating device to generate one or more scan lines. Hand-held scanners may also employ a simpler arrangement where an optical element, such as a mirror, alternately rotates through an arc in different directions, i.e. reciprocates, to generate a single scan line, as in the '288 patent. Such alternate rotation in an arc or reciprocation, typically in small amplitude motions, is referred to herein as dithering.

A problem arises where laser scanners, in particular hand-held scanners, are used to scan bar code labels located a great distance from the laser scanner. Over distances of several feet scan lines become so diffuse that they are not readily visible on a target, making it difficult to properly aim the scanner at the target or effectively manipulate the target to be read. This is because the path of the beam across the surface carrying the bar code label is not visible to the operator of the scanner due to the high speed of movement of the beam tracing the scan line. Thus, for example, it has been found that targeting and reading a bar code 3 inches by 1 inch in size at a distance of five feet becomes problematic.

In response to this problem laser scanners have been developed having a two-position trigger which causes the laser scanner to generate either a scan line or a fixed pointer beam for aiming the laser scanner. The fixed pointer beam is visible over a greater distance, because the light energy is concentrated in a spot. However, the two-position scanners have the disadvantage of requiring manual switching of the scanner between operating modes and, once switched from the pointing mode back to the scanning mode, they again leave the operator "blind" to the direction in which the scanner is pointed while scanning.

Accordingly, further improvements in performance and improved targeting capability are desired to satisfy the continuing need for high performance scanners used in a wide range of applications.

SUMMARY OF THE INVENTION

The present invention satisfies that need by providing an optical arrangement which simultaneously generates both a pointer beam and a scan pattern by multiplexing the laser beam from a single laser source. In accordance with the present invention, the term multiplexing is used to mean the simultaneous transmission along two or more paths of a laser beam from a single source, such as by time division or phase division of the laser beam.

In the present invention multiplexing of the laser beam is possible in a laser scanner without effecting the efficacy of the laser beam scan pattern. For example, because the duty cycle of a spinning or rotating device used in a scanner to generate a scan pattern is typically around 55%, the laser beam may be used around 45% of the time to generate a pointer beam. As well, while the duty cycle of a dithering mirror used to generate a scan pattern may be greater than 55%, it is possible to control the duty cycle to make the laser beam available to generate a pointer beam. It may be understood that to multiplex a laser beam between two paths may require timed coordination between use of the laser beam to produce a pointer beam and use of the laser beam to generate at least one scanning beam of a scan line pattern.

In accordance with the present invention, an optical arrangement is provided to produce both a laser beam scan pattern and a pointer beam. The optical arrangement includes means for multiplexing a laser beam between at least one pointer beam path, from which a pointer beam is produced, and at least one scanning beam path. The optical arrangement further includes means for redirecting the laser beam from the scanning beam path(s) to produce a laser beam scan pattern.

The present invention provides various means for multiplexing, set forth in three embodiments. The means for multiplexing include refractive optical elements in the first embodiment, reflective optical elements in the second embodiment, and electronic means for modifying one or more laser beam properties in the third embodiment. The means for multiplexing includes means for altering the position of the refractive or reflective optical elements, or means for operating the means for modifying laser beam properties.

In a first embodiment, the means for multiplexing comprises a refractive optical component and means for altering the position of the refractive optical component. The refractive optical components disclosed are of several types. In a first alternative design the refractive optical component is a transparent polygon mounted to rotate about a first axis. The transparent polygon is positioned to intercept the laser beam emitted by the laser source, and the laser beam is transmitted through the transparent polygon, entering and exiting successively through pairs of faces as the transparent polygon rotates. The laser beam refracts across the pair of faces and, as the transparent polygon rotates, the refracted beam sweeps repeatedly across an arc. A portion of each sweep of the refracted laser beam sends the beam along at least one pointer beam path, preferably producing a pointer beam, and along at least one scanning beam path, where it is, preferably, redirected to produce one or more scanning beams. Each scanning beam is visible as a scan line upon a package or bar code label.

In a second alternative design the refractive optical component is a transparent spoked window, again mounted for rotation about a first axis. Preferably, a fixed, central mirror is mounted generally along the first axis above the spoked window and is positioned to intercept the laser beam from its source, and reflect it diagonally along a path to alternately intercept ones of a plurality of spokes extending generally radially from the window, and ones of radial slots separating the spokes, as the optical window rotates. Alternatively, the laser source may be positioned to emit the laser beam along the desired path, without need for the central mirror. Regardless, as the spoked window rotates, the laser beam is alternately refracted and transmitted therethrough. The laser beam is refracted by transmission through the radial spokes to at least one pointer beam path, whereupon the beam encounters a routing mirror and is reflected to produce a pointer beam. Alternating with refraction, the laser beam is transmitted unchanged through the radial slots, and continues along at least one scanning beam path, whereupon the beam encounters one or more routing mirrors and is redirected to produce one or more scanning beams.

In a third alternative design the refractive optical component comprises a first transparent prism which is mounted to be cyclically reciprocated in and out of the path of the laser beam emitted by the laser source. When positioned to intercept the laser beam, the first prism refracts the beam along at least one pointer beam path, whereupon the refracted beam preferably encounters a second prism which further refracts the beam along the pointer beam path to produce the pointer beam in the desired direction. A routing mirror may, alternatively, be used instead of a second prism. When the first prism is out of the path of the laser beam, the beam continues along one or more scanning beam paths where it is redirected to produce one or more scanning beams.

In a second embodiment the means for multiplexing includes a reflective optical component, and means for altering the position of the reflective optical component. The reflective optical components may be of several types and in various configurations. The reflective optical components preferably include mirrored surfaces, such as glass having a reflective metallic coating. In a first alternative configuration, first and second mirrors are mounted face-to-face in spaced, substantially parallel relationship on a pivot arm. The first and second mirrors are cyclically reciprocated in an arc about a pivot axis by movement of the pivot arm. Movement of the pivot arm may be up or down or side to side. The first mirror receives the laser beam emitted from the source and reflects it to the second mirror. As it moves through first and second portions of the arc, the second mirror first reflects the laser beam along at least one pointer beam path, preferably producing a pointer beam, and then reflects the laser beam along at least one scanning beam path, from which it is redirected to produce one or more scanning beams.

In a third alternative embodiment the means for multiplexing includes electronic means for modifying laser beam properties, and means for operating such electronic means. In a first design the means for modifying include a voltage tuned phase shifter which receives, modifies, and transmits the laser beam from the laser beam source. The voltage tuned phase shifter is comprised of a liquid crystal cell, as used in liquid crystal displays. In this embodiment, the laser beam source produces polarized laser light. Upon application of voltage, the voltage tuned phase shifter changes from transmitting horizontal polarized light to vertical polarized light. Thus, the voltage tuned phase shifter may be, alternately, activated and deactivated to divide the incident laser beam into two types of polarized light, referred to for convenience herein as shifted (vertical) and unshifted (horizontal) light. The transmitted laser beam, whether of shifted or unshifted light advances to a polarization sensitive mirror. The polarization sensitive mirror may be, for example, a polarizing beam splitter. The polarization sensitive mirror then transmits unshifted light to at least one pointer beam path to produce the pointer beam, while reflecting the shifted light along at least one scanning beam path. The shifted light is then redirected to produce one or more scanning beams. Other electronic means for modifying the laser beam properties may be used in like fashion to alternately divert segments of the beam repeatedly along at least one pointer beam path and scanning beam path.

In each of the first, second and third embodiments of the means for multiplexing, the means for redirecting the laser beam along the scanning beam path include means for scanning. Such means for scanning may include spinning or rotating optical devices having a plurality of primary reflective surfaces, or may include dithering optical elements such as dithering mirrors. The means for redirecting may further include at least one plurality of secondary reflective elements. Secondary reflective elements of each plurality of secondary reflective elements are disposed in positions relative to one another to receive and reflect the laser beam reflected from a rotating or dithering optical device to produce additional scanning beams of a scan pattern. An optical arrangement including pluralities of secondary reflective elements is shown by Hellekson in the '973 patent, which is incorporated herein by reference.

In the present invention it is preferred to also include means for timing the operation of the means for multiplexing with the means for redirecting. The means for timing used will depend on the embodiment of the means for multiplexing and the means for redirecting used. Such timing may be accomplished by mechanical connection or electronic means.

In a further aspect of the present invention a method for simultaneously producing a pointer beam and a scan pattern is provided including the steps of multiplexing a laser beam between at least one pointer beam path and at least one scanning beam path, producing a pointer beam from the laser beam along the at least one pointer beam path, and redirecting the laser beam along the at least one scanner beam path to produce one or more scanning beams. The method further includes the step of timing the step of multiplexing the laser beam with the step of redirecting the laser beam. The step of multiplexing may be performed by refracting or reflecting or electronically modifying properties of the laser beam to divide the laser beam along at least one pointer beam path and at least one scanning beam path. The step of redirecting to produce a scan pattern may be performed by reflecting the laser beam along the at least one scanning beam path to a rotating optical device or to a dithering optical element.

Accordingly it is an object of the present invention to provide a laser scanner capable of simultaneously producing a pointer beam and a laser scan pattern. It is a further object of the present invention to provide various means for multiplexing a laser beam between at least one pointer beam path and at least one scanning beam path. Another object of the present invention is to provide mans for multiplexing comprising a refractive optical component, reflective optical component, or electronic means for modifying laser beam properties. It is a still further object of the present invention to provide a means for redirecting a laser beam directed along at least one scanning beam path to produce a scanning beam. It is yet another object of the present invention to provide a means for timing the operation of the mans for multiplexing with operation of the means for redirecting.

It is still further object of the present invention to provide a method for simultaneously producing a pointer beam and a scan pattern. It is a further object of the present invention to provide a method for multiplexing a laser beam with a refractive or reflective optical component or with electronic means. Another object of the present invention is to provide a method for multiplexing a laser beam in timed relation with redirecting a scanning beam to produce a laser scan pattern. These and other objects of the invention will be apparent from the drawings and description which follow.

BRIEF DESCRIPTION OF THE DRAWINGS

FIG. 7 is a schematic top view of the optical arrangement of the present invention embodied in a laser scanner wherein the means for multiplexing comprises a refractive spoked window.

FIG. 8 is a schematic side elevational of the optical arrangement of the present invention shown in FIG. 7.

FIG. 9 is a schematic front elevational view of the optical arrangement of the present invention shown in FIG. 7.

DETAILED DESCRIPTION OF THE PREFERRED EMBODIMENT

Figure 1:
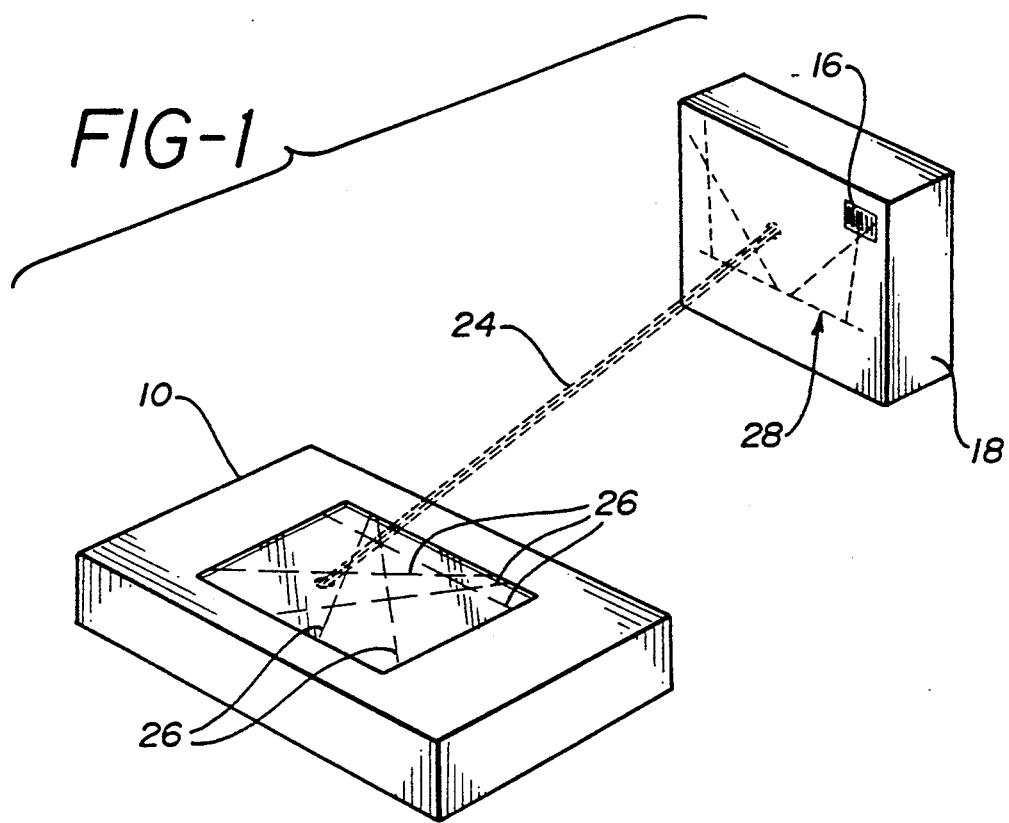
FIG. 1 is a schematic perspective view of a laser scanner simultaneously producing ak pointer beam and a laser scan pattern in accordance with the present invention.
Figure 2:
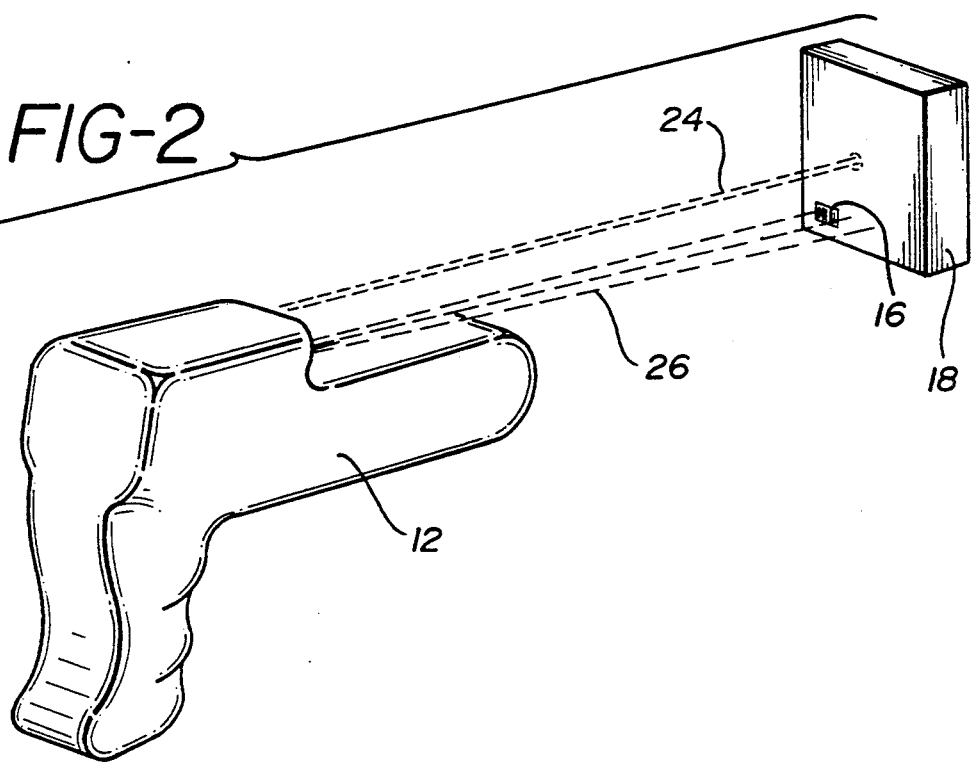
FIG. 2 is a schematic perspective view of a hand-held laser scanner simultaneously producing a pointer beam and a laser scan pattern in accordance with the present invention.

Referring to FIGS. 1 and 2, in accordance with the present invention, a counter-top laser scanner 10 and hand-held laser scanner 12 are shown which simultaneously produce a pointer beam 24 and a laser scan pattern 28 having one or more scanning beams 26. Scanners 10 and 12 thereby provide improved capability to target and read a bar code symbol 16 on a package 18 or other object located at a distance from scanner 10 or 12.

Figure 3:
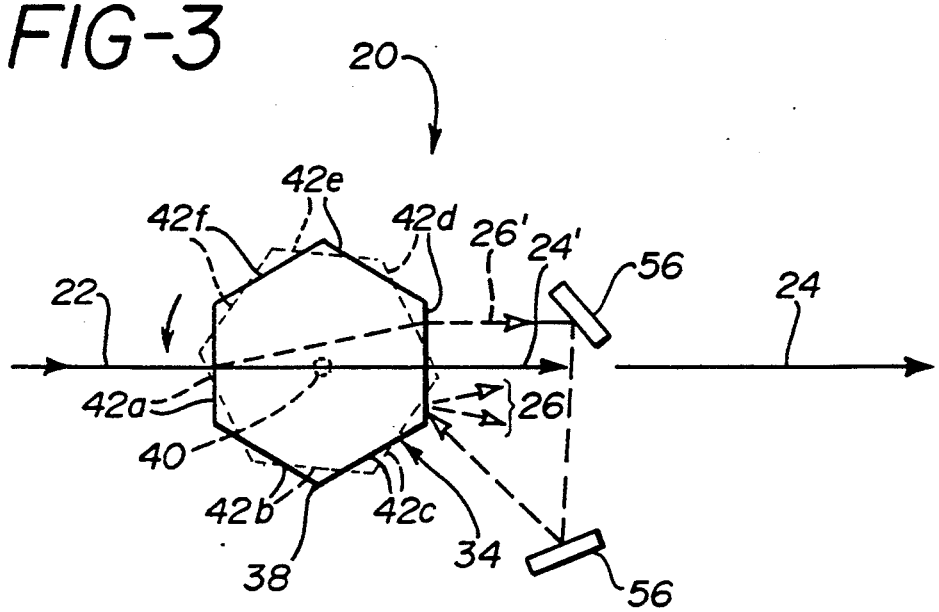
FIG. 3 is a schematic top view of the optical arrangement of the present invention wherein the means for multiplexing comprises a transparent polygon and the means for redirecting comprises a rotating optical device.
Figure 4:
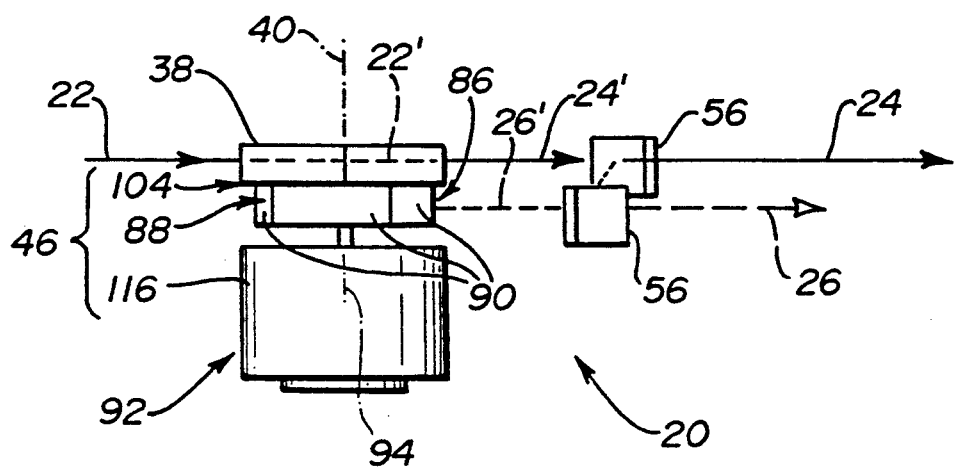
FIG. 4 is a schematic side elevational view of the optical arrangement of the present invention shown in FIG. 3.

Referring now to FIGS. 3 and 4, an optical arrangement 20 is shown which may be incorporated in a laser scanner, such as laser scanner 10 or 12. Optical arrangement 20 simultaneously generates both pointer beam 24 and one or more laser scanning beams 26 by multiplexing a laser beam 22 emitted from a single laser source 14 (not shown).

Multiplexing of laser beam 22 is possible in laser scanners 10, 12 without effecting the efficacy of the laser beam scan pattern 28 because, typically, means for scanning 86, such as rotating optical devices 88, have a duty cycle requiring use of the laser beam 22 only around 55% of the time to generate a scan pattern 28, allowing the laser beam 22 to be used around 45% of the time to generate pointer beam 24. As well, while the duty cycle of other means for scanning 86, such as a dithering mirror 96, shown in FIGS. 5-6 and 12-13, may be greater than 55%, it is possible to control the use of laser beam 22 for scanning to make laser beam 22 available to generate pointer beam 24. It may be understood that multiplexing laser beam 22 between two paths 24' and 26' preferably requires timed coordination between use of laser beam 22 to produce pointer beam 24 and use of laser beam 22 to generate scan line pattern 28.

With reference to FIGS. 3-18, in accordance with the present invention, optical arrangement 20 is provided to produce both a laser beam scan pattern 28 having one or more scanning beams 26, and a pointer beam 24. The optical arrangement includes means for multiplexing 30 a laser beam between at least one pointer beam path 24', form which pointer beam 24 is produced, and at least one scanning beam path 26' from which at least one scanning beam is produced. Optical arrangement 20 further includes means for redirecting 32 the laser beam from the scanning beam path(s) 26' to produce a laser beam scan pattern 28. Alternatively, optical arrangement 20 may further include means for redirecting the laser beam from the pointer beam path(s), such as routing mirrors, to redirect the pointer beam.

The present invention provides various means for multiplexing 30 laser beam 22. Means for multiplexing 30 includes optical components, such as refractive optical components 34, shown in FIGS. 3-13, and reflective optical components 64, shown in FIGS. 14-17, as well as electronic means for modifying 78 properties of laser beam 22, shown in FIG. 18. Means for altering the position of the optical components causes the path of the laser beam passing therethrough to be altered between the at least one pointer beam path and the at least one scanning beam path. Means for operating the electronic means for modifying properties of the laser beam cause the path of at least a portion of the laser beam to be altered as it encounters another element of the means for multiplexing.

The present invention is set forth in three embodiments wherein the means for multiplexing include refractive optical elements in the first embodiment, reflective optical elements in the second embodiment, and electronic means for modifying the laser beam properties in the third embodiment. In the first embodiment of FIGS. 3-13, means for multiplexing 30 comprises a refractive optical component 34 and means for altering the position 36 of refractive optical component 34. In a first alternative design shown in FIGS. 3-6, refractive optical component 34 is a transparent polygon 38 mounted to rotate about a first axis 40. Means for altering the position may comprise means for rotatably moving 46 transparent polygon 38, such as a first drive motor 114. Transparent polygon 38 is positioned to intercept laser beam 22 emitted by the laser source (not shown), and laser beam 22 is transmitted through transparent polygon 38, entering and exiting successively through pairs of faces 42a and 42d, 42b and 42e, and 42c and 42f, as transparent polygon 38 rotates. While a six-sided polygon is shown, other numbers of faces, such as 10, 12, 14 and so on, are possible. The laser beam 22 refracts across the pairs of faces and, as transparent polygon 38 rotates, the refracted beam 22' sweeps repeatedly across an arc. A portion of each sweep of refracted beam 22' sends the beam 22' along at least one pointer beam path 24', preferably producing a pointer beam 24, and along at least one scanning beam path 26', where it is, preferably, redirected to produce one or more scanning beams 26.

The second alternative design of the first embodiment of means for multiplexing is shown in FIGS. 7-9, and is illustratively embodied in a supporting structure 44 mountable in a laser scanner 10, 12. In this second alternative the refractive optical component 34 is a transparent spoked window 48, again mounted for rotation about first axis 40. A fixed, central mirror 47 is preferably mounted generally along first axis 40 above spoked window 48, as shown, and is positioned to intercept laser beam 22 from its source (not shown), and reflect it diagonally along a path to alternately intercept ones of a plurality of spokes 50 extending generally radially from the spoked window 48, and ones of radial slots 52 separating the spokes 50, as the spoke window 48 rotates. Thus, as the spoked window 48 rotates, laser beam 22 is alternately refracted and transmitted. The laser beam is refracted by transmission through radial spokes 50 to at least one pointer beam path 24', whereupon the beam encounters a routing mirror 54 and is reflected to produce a pointer beam 24. Alternating with refraction, laser beam 22 is transmitted unchanged through the radial slots 52, and continues along at least one scanning beam path 26', whereupon the beam encounters one or more routing mirrors 54, 56 and is redirected to produce one or more scanning beams 26 of a scan pattern 28.

Figure 10:
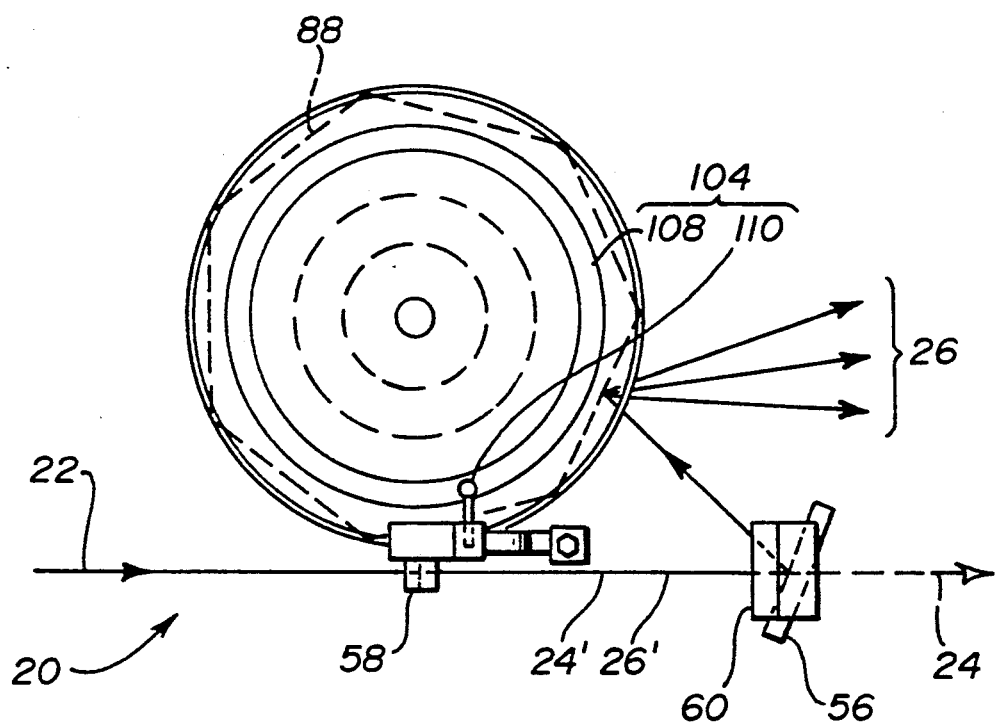
FIG. 10 is a schematic top view of the optical arrangement of the present invention wherein the means for multiplexing comprises a first transparent prism reciprocated by a cam, in and out of the path of the laser beam, and the means for redirecting comprises a rotating optical device.
Figure 11:
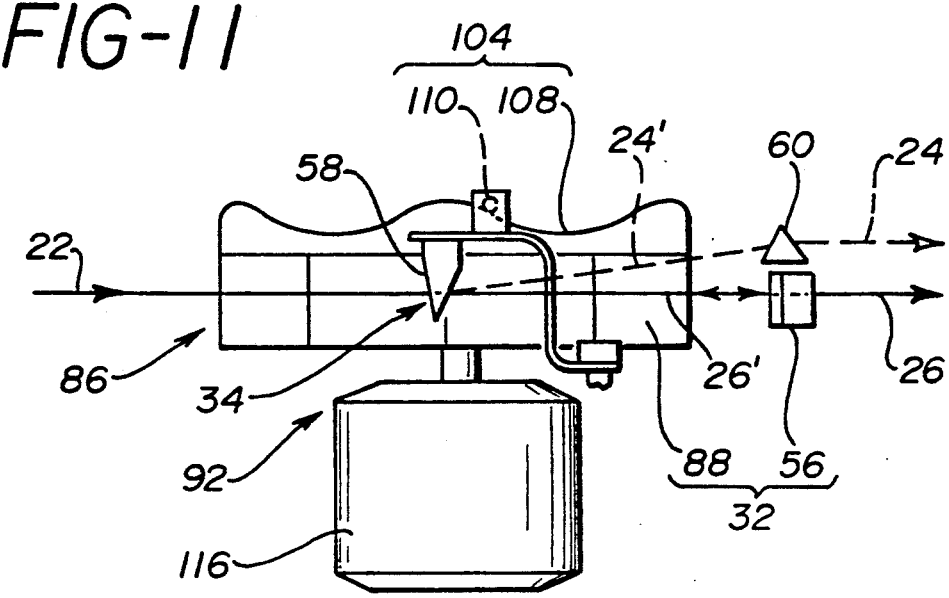
FIG. 11 is a schematic side elevational view of the optical arrangement of the present invention shown in FIG. 10 showing the cam profile which reciprocates the first transparent prism up and down, in and out of the path of the laser beam.
Figure 12:
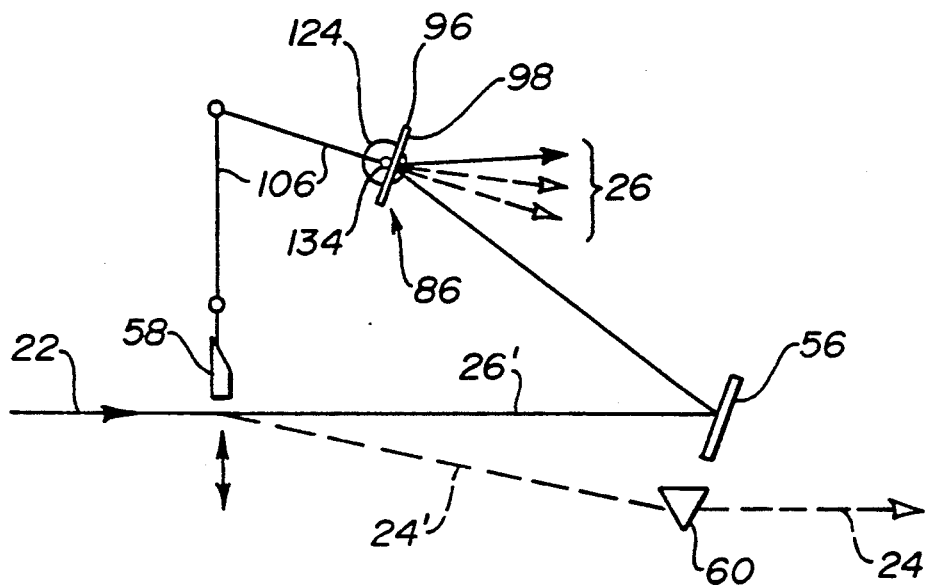
FIG. 12 is a schematic top view of the optical arrangement of the present invention wherein the means for multiplexing comprises a first transparent prism in a first position and the means for redirecting comprises a dithering optical device.
Figure 13:
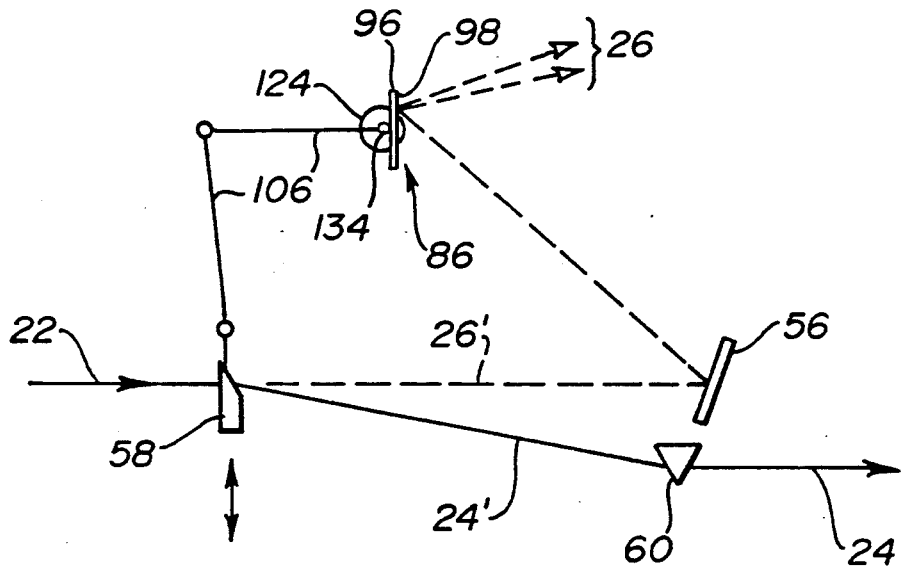
FIG. 13 is a schematic side elevational view of the optical arrangement of the present invention shown in FIG. 12 where the first transparent prism is in a second position.
Figure 16:
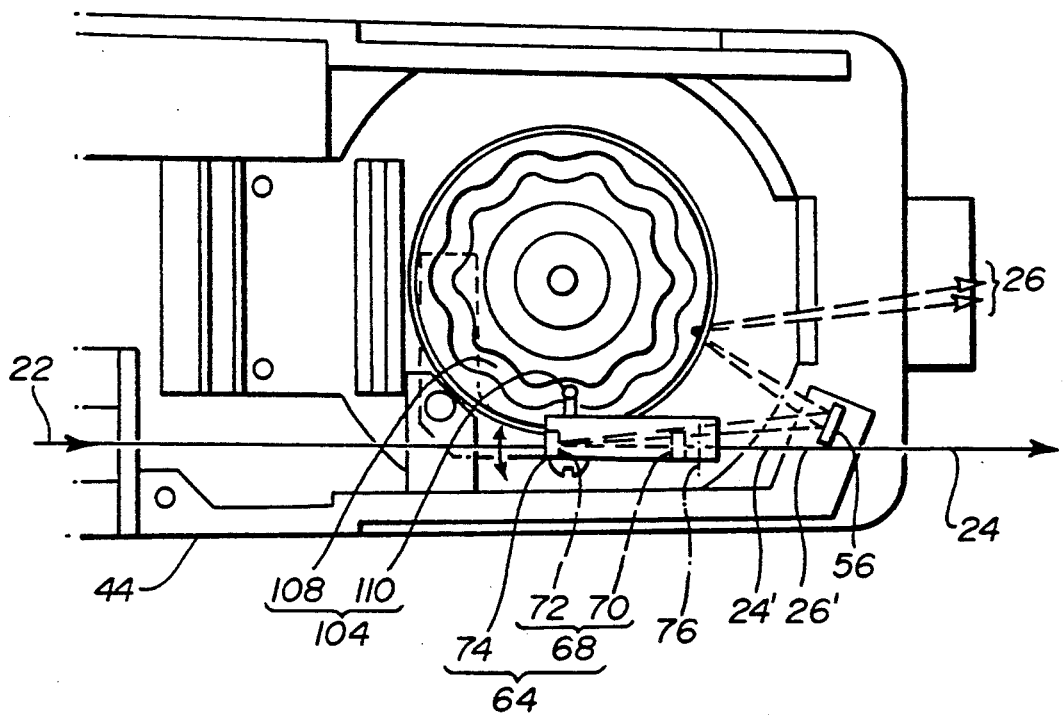
FIG. 16 is a schematic top elevational view of the optical arrangement of FIG. 14 embodied in a laser scanner, where the cam, shown in an alternative configuration, reciprocates the first and second mirrors side to side.

In a third alternative design, shown in FIGS. 10-13, optical arrangement 20 includes a refractive optical component 34 comprising a first transparent prism 58 which is cyclically reciprocated in and out of the path of the laser beam 22 emitted by the laser source (not shown). As shown in FIGS. 10 and 11, cam 108 moves first transparent prism 58 up and down. Alternatively, cam 108, shaped as shown in FIG. 16, may be used to move first transparent prism 58 in and out. When positioned to intercept laser beam 22, first prism 58 refracts laser beam 22 along at least one pointer beam path 24', whereupon the refracted beam preferably encounters a second prism 60 which further refracts laser beam 22 to produce pointer beam 24 in the desired direction. A routing mirror (not shown) may, alternatively, be used instead of second prism 60. When first prism 58 is out of the path of laser beam 22, laser beam 22 continues along one or more scanning beam paths 26' where it is redirected by routing mirror 56 to produce one or more scanning beams 26.

Figure 14:
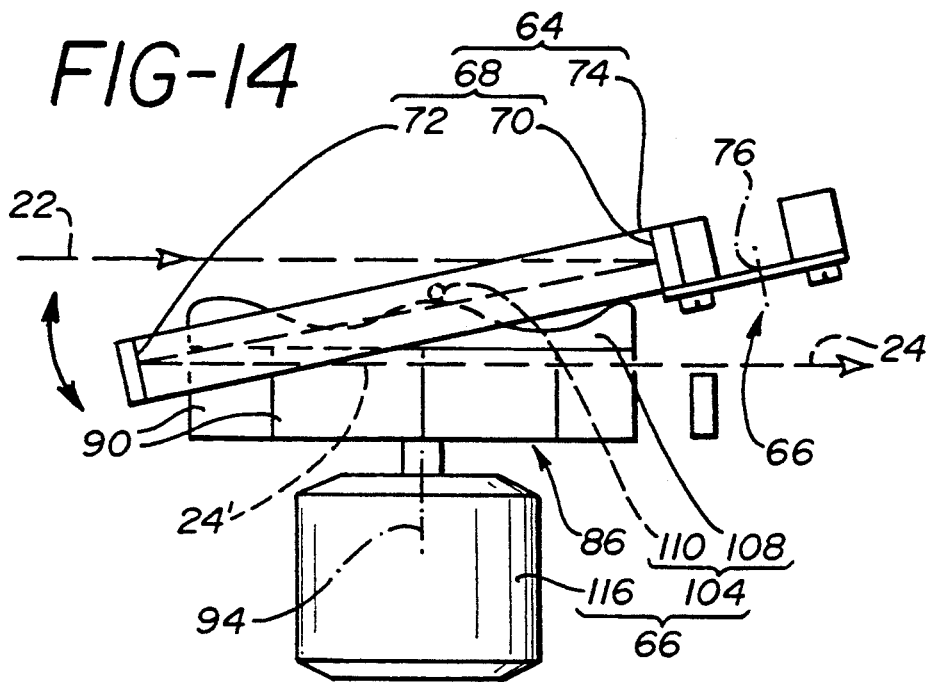
FIG. 14 is a schematic side elevational view of the optical arrangement of the present invention in a second embodiment wherein the means for multiplexing comprises first and second mirrors mounted to pivot in an arc, shown in a first position.
Figure 15:
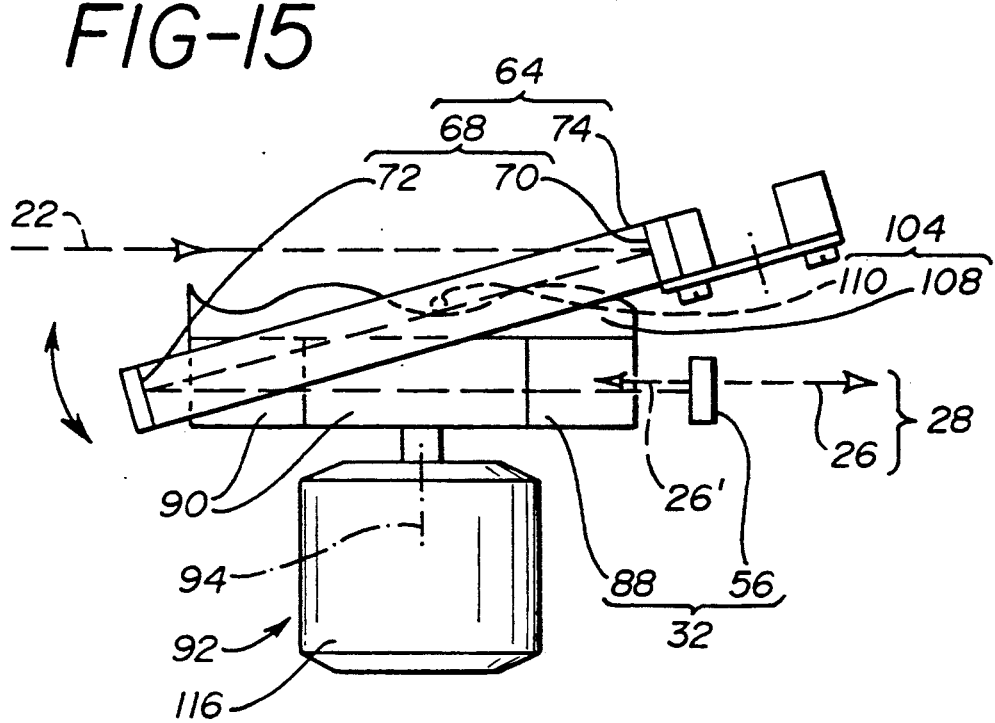
FIG. 15 is a schematic side elevational view of the optical arrangement of FIG. 8 wherein the first and second mirrors are shown in a second position.
Figure 17:
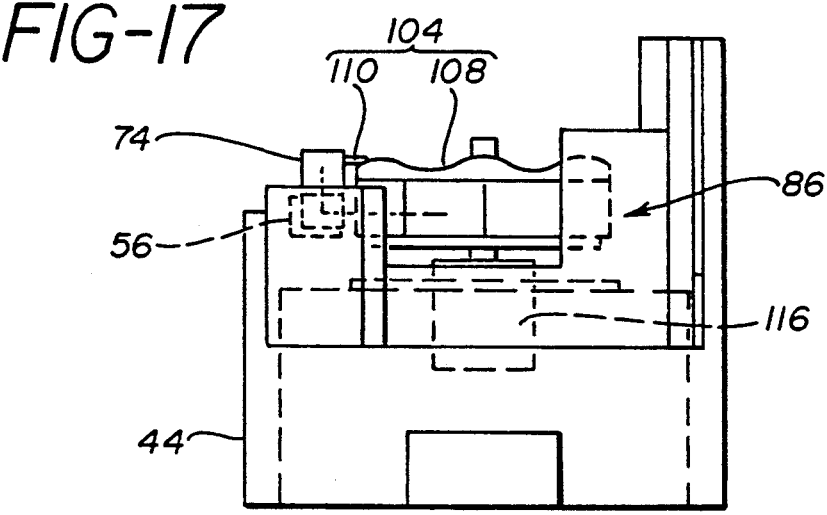
FIG. 17 is a schematic front elevational view of the optical arrangement of FIG. 14 embodied in a laser scanner.

A second embodiment of the means for multiplexing 30 is shown in FIGS. 14–17. FIGS. 14–15 show the optical arrangement 20 standing alone, while FIGS. 16–17 illustratively show the optical arrangement 20 mounted in supporting structure 44. In the second embodiment means for multiplexing 30 includes a reflective optical component 64, and means for altering the position 66 of reflective optical component. Reflective optical component 64 may be of several types and in various configurations. In a first configuration reflective optical component 64 comprises mirror set 68, including first and second mirrors 70, 72, respectively, mounted face-to-face in spaced, substantially parallel relationship on pivot arm 74. First and second mirrors 70, 72 are cyclically reciprocated in an arc about a pivot axis 76 by movement of pivot arm 74. Pivot arm 74 may be reciprocated side to side or up and down. First mirror 70 receives laser beam 22 emitted from the source (not shown) and reflects it to second mirror 72. As it moves through first and second portions of the arc, second mirror 72 first reflects laser beam 22 along at least one pointer beam path 24', preferably producing a pointer beam 24, and then reflects the laser beam 22 along at least one scanning beam path 26', from which it is redirected by routing mirror 56 to produce one or more scanning beams 26 of a scan pattern 28.

Figure 18:
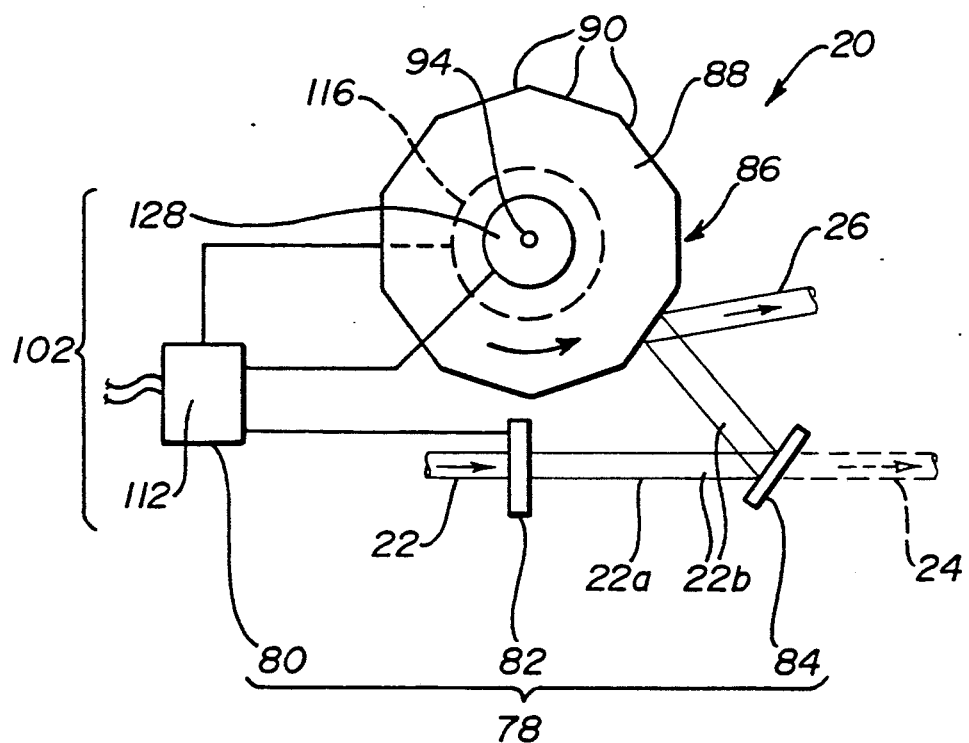
FIG. 18 is a schematic top elevational view of the optical arrangement of the present invention in a third embodiment wherein the means for multiplexing comprises a voltage tuned phase shifter.

In a third alternative embodiment of optical arrangement 20, shown in FIG. 18, means for multiplexing 30 includes electronic means for modifying 78 laser beam properties, and means for operating 80 such electronic means 78. In a first design the electronic means for modifying 78 include a voltage tuned phase shifter 82 which receives, modifies, and transmits laser beam 22 from the laser beam source (not shown). In this embodiment, the laser beam 22 is initially polarized at the laser beam source. The voltage tuned phase shifter, comprised of a liquid crystal cell, such as used in liquid crystal displays, receives the laser beam 22, and transmits it to a polarization sensitive mirror 84. Upon application of voltage, the voltage tuned phase shifter 82 will bend the light 90 degrees as it is transmitted therethrough, changing horizontal polarized light to vertical polarized light. The laser beam 22 transmitted therethrough is, thus, divided into two types of polarized light, referred to for convenience as unshifted (horizontal) and shifted (vertical) light 22a, 22b, 22b, respectively. A polarization sensitive mirror 84, such as a polarizing beam splitter, then transmits unshifted light 22a to at least one pointer beam path 24' to produce pointer beam 24, while reflecting shifted light 22b along at least one scanning beam path 26', or vice versa, depending on the particular polarizing beam splitter used. The shifted light 22b is then redirected to produce one or more scanning beams 26 of a scan pattern 28. Again, alternately, the shifted light 22b may be transmitted and unshifted light 22a reflected, depending on the type or orientation of polarization sensitive mirror 84.

In each of the first, second and third embodiments of the means for multiplexing 30, shown in FIGS. 3–18, means for redirecting 32 the laser beam along the scanning beam path 26' includes means for scanning 86. Means for scanning may comprises a rotating optical device 88 having one or more, and preferably a plurality of primary reflective surfaces 90, and means for rotating 92 the rotating optical device 88 about a second axis 94. Alternatively, means for scanning 86 may include a dithering optical device 96, such as a dithering mirror 98, and means for dithering 100 dithering optical device 96. Preferably, the means for redirecting further includes one or more routing mirrors 56.

Figure 19:
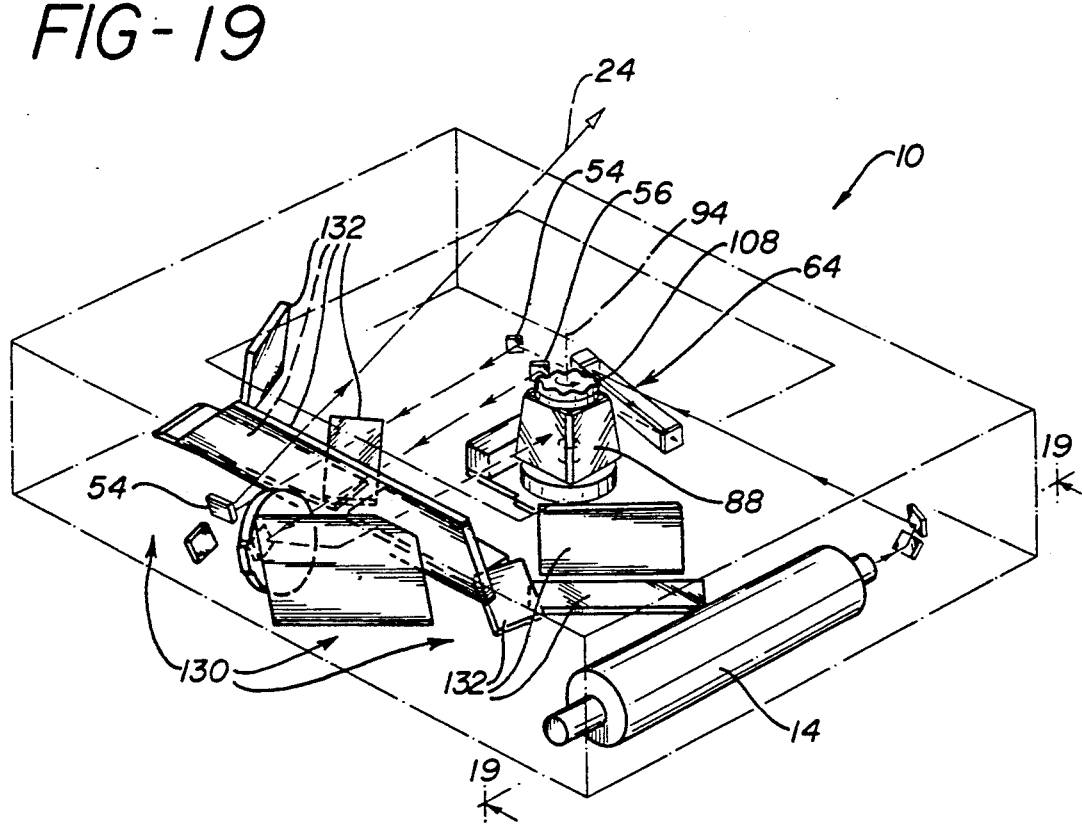
FIG. 19 is a schematic perspective view of the laser scanner of FIG. 1 representatively incorporating the second embodiment of the present invention.
Figure 20:
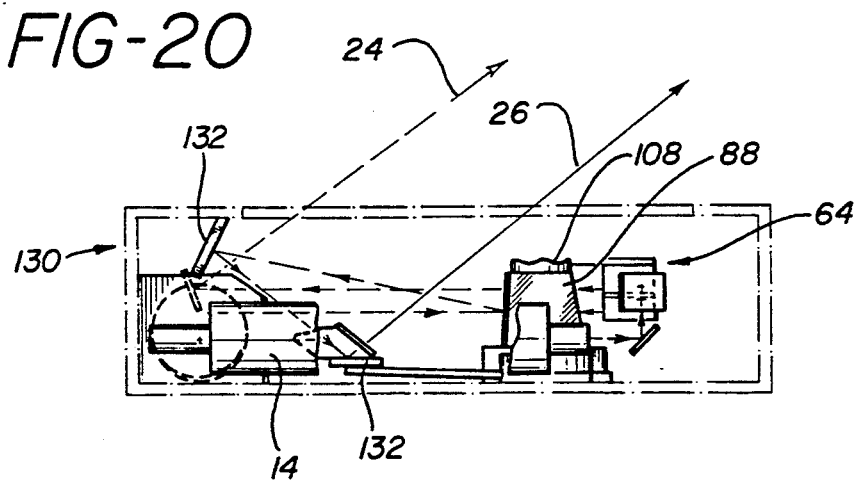
FIG. 20 is a side perspective view of the laser scanner shown in FIG. 19 taken along line 19—19.

The means for redirecting may further include at least one plurality 130 of secondary reflective elements 132. FIGS. 19 and 20 show a laser scanner 10 representatively incorporating the second embodiment of the present invention. FIG. 19 shows the pluralities 130 of secondary reflective elements 132 which produce one or more scanning beams as rotating optical device 88 rotates through its rotational cycle about second axis 94. Secondary reflective elements 132 in each plurality thereof are disposed in positions relative to one another to receive and reflect laser beam 22 as it is reflected from rotating or dithering optical device 88, 96, and produces additional scanning beams 26 of scan pattern 28. FIG. 20 shows both the pointer beam 24 produced from scanner 10 in accordance with the present invention and a scanning beam 26 which further is redirected by rotating optical device 88 and a plurality of secondary reflective elements 132. While such an optical arrangement 20 including pluralities 130 of secondary reflective elements 132 producing a plurality of scan lines is shown by Hellekson in the '973 patent, which is incorporated herein by reference, simultaneous production of both a pointer beam 24 and scanner beam 26 from a laser source 14 in combination with a plurality of secondary reflective elements 132 are shown in accordance with the present invention.

In the present invention it is preferred to include means for timing 102 the operation of the means for multiplexing 30 with the means for redirecting 32. The means for timing 102 used will depend upon which embodiment of the means for multiplexing 30 and which means for redirecting 32 are used, and various means for timing 102 are shown in FIGS. 4–18. Means for timing 102 may comprise one or more mechanical means for connecting 104 as in FIGS. 4 and 7–17, such as mechanical linkages 106 in FIGS. 12–13, cams 108 and cam followers 110 in FIGS. 10–11 and 14–17, or may comprise electronic means for controlling 112 as in FIGS. 5–6 and 18, or both mechanical and electronic means 104, 112.

By way of example, but not limitation, various means for redirecting 32 and related means for timing 102 are illustrated in FIGS. 3–18. Referring again to FIGS. 3–9, in the first embodiment of means for multiplexing 30 where rotating optical components 34, such as transparent polygon 38 and spoked window 48, are used to multiplex laser beam 22, it is preferred that the means for redirecting 32 include rotating optical devices 88. Thus, for instance, where transparent polygon 38 is used to multiplex laser beam 22, as shown in FIGS. 3–4, it may be mounted on rotating optical device 88. In this case the means for rotatably moving 46 transparent polygon 38, also comprises means for timing 102. That is, transparent polygon 38 is simply mounted on rotating optical device 88, which is driven by means for rotating 92, second drive motor 116.

As shown in FIGS. 7-9, and shown best in FIG. 8, rotation of spoked window 48 for multiplexing may, in like fashion, also be timed by mounting it on rotating optical device 88. Again, rotating optical device 88 also functions as means for redirecting refracted laser beam 22' from the scanning beam path(s) 26', so that refraction and redirection of the laser beam are in timed relation.

Figure 5:
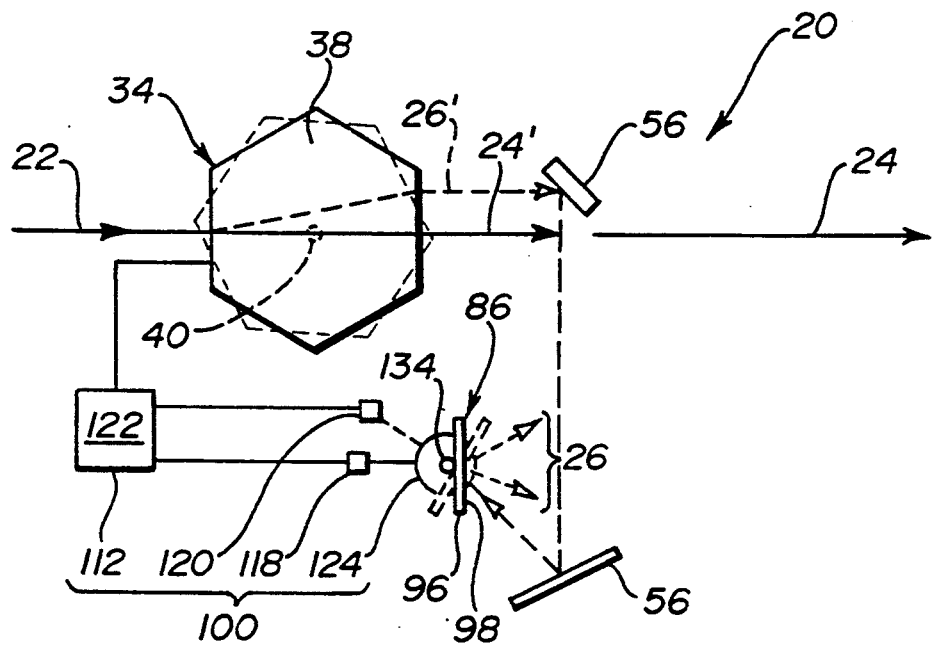
FIG. 5 is a schematic top view of the optical arrangement of the present invention wherein the means for multiplexing comprises a transparent polygon and the means for redirecting comprises a dithering optical device.
Figure 6:
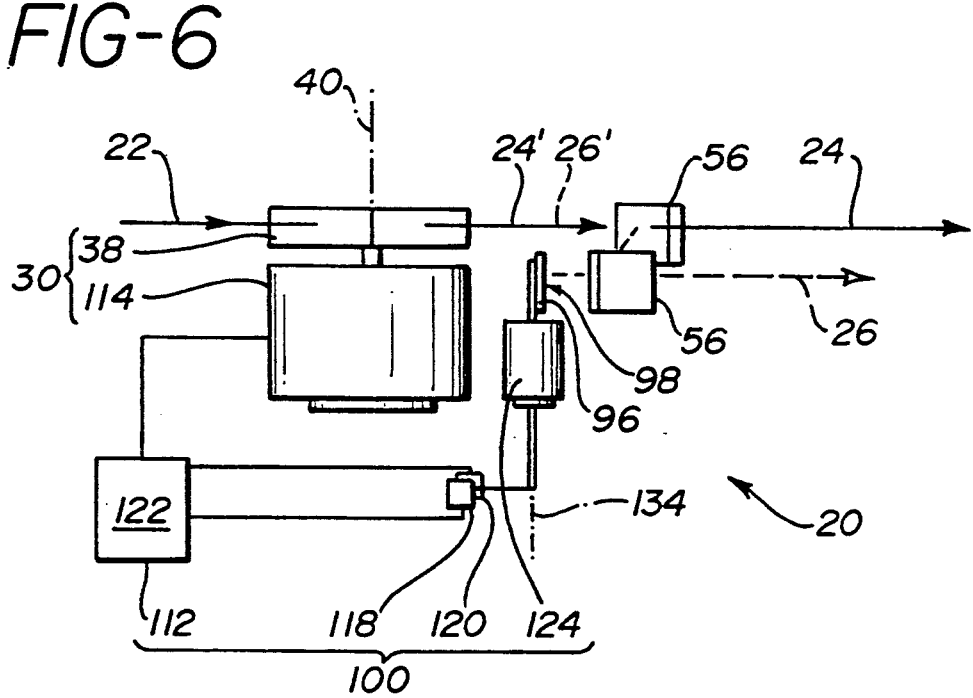
FIG. 6 is a schematic side elevational veiw of the optical arrangement of the present invention shown in FIG. 5.

With reference to FIGS. 5-6 means for redirecting 32 includes means for dithering 100 dithering optical device 96 to produce a scan pattern 28. Means for dithering 100 includes a third drive motor 124 which oscillates dithering optical device 96, preferably a mirror 98, between first and second limit sensors 118, 120 about a third axis 134. Limit sensors 118, 120 control the reciprocating or dithering motion imparted by third drive motor 124 to mirror 98. The operation of transparent polygon 38 in timed relation with dithering of dithering optical device 96 preferably comprises electronic means for controlling 112, as shown, although mechanical means for connecting 104 are also possible. Electronic means for controlling 112 includes a control circuit 122 which controls the operation of third drive motor 124 in response to input from first and second limit sensors 118, 120. Third drive motor 124 may be further operated in response to input from a first drive motor 114. Alternatively, control circuit 122 may control the operation of either or both first and second drive motors 114, 124. Regardless, control circuit 122 may be used to time and control the rotation of transparent polygon 38 about first axis 40 and dithering of optical element 96 about third axis 134.

By way of further example, in accordance with the first and second embodiments of the means for multiplexing 30, where optical components, such as first prism 58 shown in FIGS. 10-11 and mirror set 68 shown in FIGS. 14-15, are reciprocated to multiplex laser beam 22, and where the means for redirecting 32 includes a rotating optical device 88, it is preferred that means for reciprocating the optical component includes a sinusoidal-shaped cam 108, as shown in FIGS. 10 and 14, mounted on rotating optical device 88 and a mating cam follower 110 mounted on the optical component. By virtue of such mechanical connection, means for altering the position 36 or 66 the optical components again further comprise the means for timing 102. That is, timing results by simply attaching the optical component to cam follower 110 which engages in cam 108. The cam 108 and cam follower 110, thus serve to cyclically reciprocate the optical component in timed relation with the rotating optical device 88. Thus, for example, in the second embodiment of means for multiplexing 30, mirror set 68 mounted on pivot arm 74, may likewise be cyclically reciprocated through an arc by attachment of the pivot arm 74 to cam follower 110 engaged in such a cam 108.

In a still further example, in accordance with the third embodiment of the means for multiplexing, shown in FIG. 18, where a voltage tuned phase shifter 82 is used to multiplex laser beam 22, means for timing 102 preferably comprises a voltage reading generated by an encoder 128 mounted on rotating optical device 88 or dithering optical device 96. Encoder 128 generates a control signal related to the position of the rotating optical device 88 or dithering optical device 96, which switches the voltage on phase shifter 82 at the right time to allow scanning when rotating optical device 88 or dithering optical device 96 is properly positioned.

As illustrated by the examples above, operation of the optical components used to multiplex laser beam 22 may be accomplished in timed coordination with a rotating optical device 88 or dithering optical device 96. The materials of used, means for connecting and powering are as known in the art, unless otherwise stated.

In a further aspect of the present invention a method for simultaneously producing a pointer beam 24 and a scan pattern 28 of one or more scan lines 26 is provided including the steps of multiplexing a laser beam 22 between at least one pointer beam path 24' and at least one scanning beam path 26', producing a pointer beam 24 from the laser beam 22 from the at least one pointer beam path 24', and redirecting the laser beam 22 along the at least one scanner beam path 26' to produce at least one scanning beam 26 of scan pattern 28. The method further includes the step of timing the step of multiplexing the laser beam 22 with the step of redirecting the laser beam. The step of multiplexing may be performed by refracting or reflecting or electronically modifying properties of the laser beam 22 to divide the laser beam 22 along at least one pointer beam path 24' and at least one scanning beam path 26'. The step of redirecting to produce a scan pattern 38 may be performed by directing the laser beam 22 along the at least one scanning beam path 26' to a rotating optical device 88 or to a dithering optical device 96 to produce at least one scanning beam 26. The step of directing laser beam 22 may further comprise reflecting laser beam 22 from the at least one scanning beam path 26' with one or more routing mirrors 56 to rotating or dithering optical device 88 or 96. The step of redirecting may further include reflecting laser beam 22 to one or more pluralities 130 of secondary reflective elements 132 to produce one or more scanning beams 26.

Further detailed recitation of the steps of the method is not necessary as those steps, in like fashion, follow the function and operation of the components, devices, elements and other parts of the optical arrangement 20 of the present invention, set forth above.

While certain representative embodiments and details have been shown for purposes of illustrating the invention, it will be apparent to those skilled in the art that various changes in the apparatus and method disclosed herein may be made without departing from the scope of the invention which is defined in the appended claims.

What is claimed is:

1. In a laser scanner, an optical arrangement for multiplexing and redirecting a laser beam to simultaneously produce both a laser beam scan pattern and a pointer beam comprising:
    means for multiplexing a laser beam between at least one pointer beam path producing a pointer beam and at least one scanning beam path; and
    means for redirecting said laser beam from said at least one scanning beam path to produce a laser beam scan pattern.

2. The arrangement of claim 1 wherein said means for multiplexing comprises:
    an optical component; and
    means for altering the position of said optical component to alter the path of said laser beam.

3. The arrangement of claim 2 wherein said optical component comprises a reflective optical component.

4. The arrangement of claim 3 wherein said reflective optical component comprises first and second mirrors mounted face-to-face in spaced, substantially parallel relationship on a pivot arm and adapted to be cyclically reciprocated in an arc about a pivot axis, said first mirror adapted to receive and reflect a laser beam to said second mirror and said second mirror adapted to receive and reflect said laser beam to at least one pointer beam path and at least one scanning beam path as said pivot arm moves successively through portions of said arc.

5. The arrangement of claim 4
wherein said means for altering the position of said optical component comprises means for cyclically reciprocating said pivot arm in an arc about said pivot axis;
wherein said means for redirecting comprises:
a dithering optical device mounted on a rotatable mount for movement through a scanning arc about a third axis, said dithering optical device adapted to receive and reflect said laser beam from said at least one scanning beam path to produce at least one laser beam scanning beam; and
means for dithering said dithering optical device about said third axis to reflect said laser beam in said at least one scanning beam path to trace at least one scanning beam of a laser scan pattern; and
wherein said arrangement further comprises means for timing the cyclical reciprocation of said pivot arm with the position of said dithering optical device as it moves through each scanning arc.

6. The arrangement of claim 5 wherein said means for timing comprises:
a hinge means for rotating attached to said pivot arm at a first end thereof for rotating said pivot arm through an arc about said pivot axis; and
means for mechanically connecting said pivot arm at a second end thereof to said dithering optical device to move said pivot arm in time with the motion of said dithering optical device as it moves through each scanning arc.

7. The arrangement of claim 4
wherein said means for altering the position of said optical component comprises means for cyclically reciprocating said pivot arm in an arc about said pivot axis;
wherein said means for redirecting comprises:
a rotating optical device mounted for movement repetitively through a rotational cycle about a second axis and having a plurality of primary reflective elements oriented in angularly displaced relation from one to the next about said second axis, each of said primary reflective elements being adapted to receive and reflect a laser light beam from said at least one scanning beam path as said primary reflective elements move successively through a portion of each rotational cycle of said rotating optical device; and
means for rotating said rotating optical device about said second axis; and
wherein said arrangement further comprises means for timing the cyclical reciprocation of said pivot arm with the position of said rotating optical device as it moves through each rotational cycle.

8. The arrangement of claim 7 wherein said means for timing comprises:

a cam mounted on said rotating optical device and positioned for movement about said second axis;
a hinge means for rotating attached to said pivot arm at a first end thereof for rotating said pivot arm through an arc about said pivot axis; and
a cam follower adapted to follow said cam and attached to said pivot arm at a second end thereof, said cam and said cam follower adapted to impart a reciprocating motion to said pivot arm as said rotating optical device moves through portions of each rotational cycle.

9. An arrangement as recited in claim 2 wherein said means for altering the position of said optical component comprises means for rotatably moving said optical component in the path of said laser beam.

10. The arrangement of claim 2 wherein said means for altering the position of said optical component comprises means for cyclically reciprocating said optical component in and out of the path of said laser beam.

11. The arrangement of claim 2 wherein means for altering the position of said optical component comprises means for cyclically reciprocating said optical component while in the path of said laser beam.

12. The arrangement of claim 11 wherein said means for cyclically reciprocating said optical component comprises a rotatable means for hinging said optical component at a first end thereof, and a source of reciprocating mechanical power connected to a second end thereof.

13. The arrangement of claim 2 wherein said optical component comprises a refractive optical component.

14. The arrangement of claim 13 wherein said refractive optical component comprises a transparent polygon mounted for movement repetitively through a rotational cycle about a first axis and having a plurality of faces oriented in angularly displaced relation from one to the next about said first axis, said transparent polygon adapted to transmit and refract a laser beam through pairs of said faces as said transparent polygon moves successively through a portion of each rotational cycle, and transmit and refract said laser beam to at least one pointer beam path and at least one scanning beam path during each of said portions of each rotational cycle.

15. The arrangement of claim 14
wherein said means for altering the position of said optical component comprises means for rotatably moving said transparent polygon about said first axis;
wherein said means for redirecting comprises:
a dithering optical device rotatably mounted for movement through a scanning arc about a third axis, said dithering optical device adapted to receive and reflect said laser beam from said at least one scanning beam path to produce at least one laser beam scanning beam; and
means for dithering said dithering optical device about said third axis to reflect said laser beam in said at least one scanning beam path to trace at least one scanning beam of a laser scan pattern; and
wherein said arrangement further comprises means for timing the rotation of said transparent polygon with the position of said dithering optical device as it moves through each scanning arc.

16. The arrangement of claim 14
wherein said means for altering the position of said optical component comprises means for rotatably moving said transparent polygon about said first axis;

wherein said means for redirecting comprises:

a rotating optical device mounted for movement repetitively through a rotational cycle about a second axis and having a plurality of primary reflective elements oriented in angularly displaced relation from one to the next about said second axis, each of said primary reflective elements being adapted to receive and reflect a laser light beam from said at least one scanning beam path as said primary reflective elements move successively through a portion of each rotational cycle of said rotating optical device; and means for rotating said rotating optical device about said second axis; and wherein said arrangement further comprises means for timing the rotation of said transparent polygon with the position of said rotating optical device as it moves through each rotational cycle, said means for timing comprising mounting said transparent polygon on said rotating optical device with said first axis and said second axis in substantial alignment.

17. The arrangement of claim 13 wherein said refractive optical component comprises a transparent spoked window mounted for movement repetitively through a rotational cycle about a first axis, said spoked window having a plurality of spokes extending generally radially from said first axis and separated by radial slots, said spoked window having a central mirror mounted generally along said first axis and positioned to receive and reflect a laser beam, and said spoked window adapted to receive, transmit and refract a laser beam through ones of said spokes to said at least one pointer beam path and, alternately, to transmit said laser beam through ones of said slots to said at least one scanning beam path as said transparent spoked window moves through portions of said rotational cycle.

18. The arrangement of claim 13 wherein said refractive optical component comprises a first transparent prism mounted for cyclically reciprocating into and out of the path of a laser beam, said laser beam directed along said at least one scanning beam path, and said first transparent prism adapted to intercept and refract said laser beam to said at least one pointer beam path when moved into the path of said laser beam.

19. The arrangement of claim 18
wherein said means for altering the position of said optical component comprises means for cyclically reciprocating said first transparent prism into and out of the path of said laser beam;

wherein said means for redirecting comprises:

a dithering optical device mounted on a rotatable mount for movement through a scanning arc about a third axis, said dithering optical device adapted to receive and reflect said laser beam from said at least one scanning beam path to produce at least one laser beam scanning beam; and means for dithering said dithering optical device about said third axis to reflect said laser beam in said at least one scanning beam path to trace at least one scanning beam of a laser scan pattern; and said arrangement further comprising means for timing the cyclical reciprocation of said first prism with the position of said dithering optical device as it moves through each scanning arc.

20. The arrangement of claim 19 wherein said means for timing comprises means for mechanically connecting said dithering optical device to said first prism to reciprocate said first prism in time with the motion of said dithering optical device as it moves through each scanning arc.

21. The arrangement of claim 18
wherein said means for altering the position of said optical component comprises means for cyclically reciprocating said first prism in and out of the path of said laser beam;

wherein said means for redirecting comprises:

a rotating optical device mounted for movement repetitively through a rotational cycle about a second axis and having a plurality of primary reflective elements oriented in angularly displaced relation from one to the next about said second axis, each of said primary reflective elements being adapted to receive and reflect a laser light beam from said at least one scanning beam path as said primary reflective elements move successively through a portion of each rotational cycle of said rotating optical device; and means for rotating said rotating optical device about said second axis; and wherein said arrangement further comprises means for timing the cyclical reciprocation of said first prism with the position of said rotating optical device as it moves through each rotational cycle.

22. The arrangement of claim 21 wherein said means for timing comprises:

a cam mounted on said rotating optical device and positioned for movement about said second axis; and a cam follower adapted to follow said cam and attached to said first prism, said cam and said cam follower adapted to impart a reciprocating motion to said first prism as said rotating optical device moves through portions of each rotational cycle.

23. The arrangement of claim 21 further comprising means for redirecting said pointer beam, wherein said means for redirecting comprises one or more second prisms.

24. The arrangement of claim 1 wherein said means for multiplexing comprises electronic means for modifying one or more properties of said laser beam to alter the path of at least a portion of said laser beam.

25. The arrangement of claim 24 wherein said electronic means for modifying said laser beam comprises:

a voltage tuned phase shifter positioned to receive and transmit a laser beam and adapted to alternate the phase of light transmitted therethrough from unshifted to phase-shifted by applying voltage thereto;

a polarization sensitive mirror positioned to receive said laser beam transmitted through said phase shifter, and adapted to transmit unshifted light to at least one pointer beam path and to reflect phase-shifted light to at least one scanning beam path; and means for operating said phase shifter comprising means for cyclically applying voltage to said phase shifter to successively alternate the phase of light in said laser beam transmitted therethrough.

26. The arrangement of claim 25 wherein:
said means for redirecting comprises means for scanning; and said arrangement further comprises means for timing the operation of said phase shifter with the position of said means for scanning, said means for timing including means for generating a voltage control signal related to the position of said means for scanning.

27. The arrangement of claim 1 wherein said means for redirecting said laser beam from said at least one scanning beam path to produce a laser scan pattern comprises means for scanning.

28. The arrangement of claim 27 wherein said means for scanning comprises:
 a dithering optical device mounted on a rotatable mount for movement through a scanning arc about a third axis, said dithering optical device adapted to receive and reflect said laser beam in said at least one scanning beam path; and
 means for dithering said dithering optical device about a third axis to reflect said laser beam in said at least one scanning beam path to trace at least one scanning beam of a laser scan pattern.

29. The arrangement of claim 27 wherein said means for scanning comprises:
 a rotating optical device mounted for movement repetitively through a rotational cycle about a second axis and having a plurality of primary reflective elements oriented in angularly displaced relation from one to the next about said second axis, each of said primary reflective elements being adapted to receive and reflect a laser light beam from said at least one scanning beam path as said primary reflective elements move successively through a portion of each rotational cycle of said optical device; and
 means for rotating said rotating optical device about said second axis.

30. The arrangement of claim 29 further comprising one or more pluralities of secondary reflective elements, and in each of said pluralities, said secondary reflective elements thereof being disposed in positions relative to one another, said secondary reflective elements being adapted to receive the laser beam reflected from said primary reflective elements as said primary reflective elements move successively through a portion of each rotational cycle, and adapted to reflect the same to trace at least one scanning beam of the laser light beam scan pattern.

31. The arrangement of claim 29 further comprising means for timing the operation of said means for multiplexing with the position of said rotating optical device as it moves through each rotational cycle.

32. The arrangement of claim 31 wherein said means for timing comprises means for mechanically connecting said means for multiplexing to said rotating optical device.

33. The arrangement of claim 32 wherein said means for mechanically connecting comprises:
 a cam mounted on said rotating optical device for movement through said second axis; and p1 a cam follower attached to said means for multiplexing.

34. The arrangement of claim 27 wherein said means for redirecting said laser beam from said at least one scanning beam path to produce a laser beam scan pattern further comprises one or more routing mirrors adapted to receive said laser beam from said at least one scanning beam path and reflect said laser beam to said means for scanning.

35. The arrangement of claim 1 further comprising means for timing the operation of said means for multiplexing with the operation of said means for redirecting.

36. The arrangement of claim 35 wherein said means for timing comprises means for mechanically connecting said means for multiplexing to said means for redirecting.

37. The arrangement of claim 35 wherein:
 said means for timing comprises means for generating a control signal related to the operation of said means for redirecting; and
 said means for multiplexing is adapted to operate in response to said control signal.

38. The arrangement of claim 1 further comprising means for redirecting said pointer beam.

39. The arrangement of claim 38 wherein said means for redirecting said pointer beam comprise one or more pointer beam routing mirrors.

40. The arrangement of claim 38 wherein said means for redirecting said pointer beam comprises one or more second prisms.

41. In a laser scanner, an optical arrangement for multiplexing and redirecting a laser beam to simultaneously produce both a laser beam scan pattern and a pointer beam comprising:
 means for multiplexing a laser beam between at least one pointer beam path producing a pointer beam and at least one scanning beam path producing at least one scanning beam of a laser scan pattern; and
 means for redirecting said laser beam from said at least one pointing beam path to redirect said pointer beam.

42. A method for simultaneously producing a pointer beam and a scan pattern comprising:
 providing a laser light beam;
 multiplexing said laser light beam between at least one pointer beam path and at least one scanning beam path;
 producing a pointer beam from said laser beam along said at least one pointer beam path;
 redirecting said laser beam along said at least one scanning beam path to produce one or more scanning beams of a scan pattern.

43. The method of claim 42 wherein the step of redirecting said laser beam is performed in timed relation with the step of multiplexing said laser beam.

44. The method of claim 42 wherein the step of multiplexing comprises the step of transmitting said laser beam through an optical component to produce at least one pointer beam path and at least one scanning beam path.

45. The method of claim 44 wherein the step of transmitting comprises transmitting said laser beam through a refractive optical component.

46. The method of claim 44 wherein the step of transmitting comprises transmitting said laser beam through a refractive optical component.

47. The method of claim 44 wherein the step of transmitting comprises transmitting said laser beam through a rotating optical component.

48. The method of claim 44 wherein the step of transmitting comprises transmitting said laser beam through an optical component cyclically reciprocating in and out of the path of said laser beam.

49. The method of claim 44 wherein the step of transmitting comprises transmitting said laser beam through an optical component cyclically reciprocating in the path of said laser beam.

50. The method of claim 42 wherein the step of multiplexing comprises the step of transmitting said laser beam through electronic means for modifying one or more properties of said laser beam to produce at least one pointer beam path and at least one scanning beam path.

51. The method of claim 42 wherein the step of redirecting comprises the steps of:

directing said laser beam from said at least one scanning beam path to a means for scanning; and
reflecting said laser beam from said means for scanning to produce at least one scanning beam.

52. The method of claim 51 wherein said step of reflecting said laser beam from said means for scanning comprises reflecting said laser beam to one or more pluralities of secondary reflective elements.

* * * * *

UNITED STATES PATENT AND TRADEMARK OFFICE
CERTIFICATE OF CORRECTION

PATENT NO. : 5,146,463
DATED : September 8, 1992
INVENTOR(S) : Joseph F. Rando

It is certified that error appears in the above-identified patent and that said Letters Patent is hereby corrected as shown below:

Column 17, line 61, "and pl a cam" should be --and a cam--.

Signed and Sealed this

Twenty-sixth Day of October, 1993

Attest:

BRUCE LEHMAN

Attesting Officer

Commissioner of Patents and Trademarks